(12) United States Patent
Chappell

(10) Patent No.: US 9,650,134 B2
(45) Date of Patent: May 16, 2017

(54) UNMANNED AERIAL RESCUE SYSTEM

(71) Applicant: Dana R. Chappell, San Diego, CA (US)

(72) Inventor: Dana R. Chappell, San Diego, CA (US)

( * ) Notice: Subject to any disclaimer, the term of this patent is extended or adjusted under 35 U.S.C. 154(b) by 207 days.

(21) Appl. No.: 14/732,165

(22) Filed: Jun. 5, 2015

(65) Prior Publication Data

US 2016/0355257 A1    Dec. 8, 2016

(51) Int. Cl.

| | | |
|---|---|---|
| *B64C 27/52* | (2006.01) | |
| *B64C 39/02* | (2006.01) | |
| *B64D 1/10* | (2006.01) | |
| *B64D 47/06* | (2006.01) | |
| *B60Q 5/00* | (2006.01) | |
| *B64D 47/08* | (2006.01) | |

(52) U.S. Cl.
CPC ............. *B64C 39/024* (2013.01); *B60Q 5/00* (2013.01); *B64C 27/52* (2013.01); *B64D 1/10* (2013.01); *B64D 47/06* (2013.01); *B64D 47/08* (2013.01); *B64C 2201/024* (2013.01); *B64C 2201/042* (2013.01); *B64C 2201/108* (2013.01); *B64C 2201/127* (2013.01); *B64D 2211/00* (2013.01)

(58) Field of Classification Search
CPC ......... B64C 39/024; B64C 27/52; B64D 1/10; B64D 47/06; B64D 47/08
See application file for complete search history.

(56) References Cited

U.S. PATENT DOCUMENTS

| | | | | |
|---|---|---|---|---|
| D171,509 S | * | 2/1954 | LightBourn | ................ 244/23 C |
| 3,640,489 A | * | 2/1972 | Jaeger | .................. B64C 39/001 |
| | | | | 244/23 C |
| 5,823,468 A | * | 10/1998 | Bothe | ....................... B64B 1/08 |
| | | | | 244/12.3 |
| 7,400,950 B2 | * | 7/2008 | Reich | ..................... A63H 27/04 |
| | | | | 701/3 |
| 8,561,937 B2 | * | 10/2013 | Goodarzi | .............. B64C 39/024 |
| | | | | 244/17.19 |
| 8,818,572 B1 | | 8/2014 | Tofte | |
| 9,004,973 B2 | * | 4/2015 | Condon | ............... G05D 1/0033 |
| | | | | 446/37 |

(Continued)

FOREIGN PATENT DOCUMENTS

WO    2009109711 A1    9/2009

OTHER PUBLICATIONS

Inova Drone; http://www.inovadrone.com/ and http://www.inovadrone.com/product/.
Parrot Drone; http://www.parrot.com/usa/drones/.

*Primary Examiner* — Justin Benedik
(74) *Attorney, Agent, or Firm* — EIP US LLP

(57) ABSTRACT

Embodiments of unmanned aerial rescue systems are disclosed, which may comprise: a frame or chassis, a landing member, a control system, a propulsion system, a propulsion system support member, a propulsion system orientation mechanism, a rotor shield or protector, a sealed equipment container, a cover or shroud, an equipment carrier, an equipment release mechanism, a navigation system, a sensor system, a sound system, a light system, a data communication system, an emergency equipment system, and a power management system. In some embodiments, a parabolic shroud increases the performance of sensor systems of the unmanned aerial rescue system, such as sound and light systems.

19 Claims, 5 Drawing Sheets

(56) References Cited

U.S. PATENT DOCUMENTS

| | | | | |
|---|---|---|---|---|
| D741,751 S | * | 10/2015 | Klaptocz | D12/16.1 |
| D751,025 S | * | 3/2016 | Howell | D12/16.1 |
| 9,277,130 B2 | * | 3/2016 | Wang | H04N 5/23287 |
| 9,321,531 B1 | * | 4/2016 | Takayama | B64D 1/12 |
| 2002/0104921 A1 | * | 8/2002 | Louvel | A63H 27/04 |
| | | | | 244/12.1 |
| 2002/0142699 A1 | * | 10/2002 | Davis | A63H 27/12 |
| | | | | 446/37 |
| 2003/0212478 A1 | | 11/2003 | Rios | |
| 2010/0096493 A1 | * | 4/2010 | Khakimov | A62B 5/00 |
| | | | | 244/25 |
| 2011/0221692 A1 | * | 9/2011 | Seydoux | A63H 27/12 |
| | | | | 345/173 |
| 2012/0158215 A1 | * | 6/2012 | Sun | B64C 27/20 |
| | | | | 701/3 |
| 2014/0037278 A1 | * | 2/2014 | Wang | F16M 11/10 |
| | | | | 396/55 |
| 2014/0277854 A1 | | 9/2014 | Jones | |

\* cited by examiner

UNMANNED AERIAL RESCUE SYSTEM

BACKGROUND OF THE INVENTION

Aerial vehicles, such as airplanes and helicopters, have traditionally been the vehicles of choice for search and rescue operations. In particular, aerial vehicles are often best suited for rescue operations conducted over vast and rugged terrain as well as over water because aerial vehicles may cover vast distances quickly using advanced instruments to search for and provide rescue services to those in need.

However, traditional aerial vehicles, such as helicopters, airplanes, and the like, are expensive to acquire, expensive to operate, require personnel for both maintenance and operation, and generally require special bases for deployment. For example, a helicopter cannot be deployed from just any ship at sea, it must be deployed from a ship designed for helicopter operations. This problem is even more remote for most airplanes because of the special equipment needed to launch and recover airplanes on the water. Moreover, the use of traditional aerial vehicles, such as airplanes and helicopters, poses risk to rescue personnel, particularly where the vehicle needs to go into inclement conditions, such as inclement weather or dangerous terrain (e.g. mountains). In some cases, the risk to the personnel and the equipment (given its high cost) is too substantial to deploy a rescue vehicle.

Until recently, alternatives to traditional aerial vehicles were not readily available to or not practical for search and rescue personnel. However, unmanned aerial vehicles (UAVs), also known as unmanned aerial systems (UASs), have become increasingly prominent and sophisticated. In particular, technological improvements in power sources, power management, control system electronics, communication systems, build materials, and manufacturing techniques, to list just a few, have enabled increasingly customized applications for such systems.

As described herein, a novel application for unmanned aerial systems is for search and rescue operations. Like traditional aerial vehicles, unmanned aerial systems are now capable of traveling long distances at high rates of speed, deploying advanced instruments, and providing direct action rescue services Unlike traditional aerial vehicles, however, unmanned aerial systems may accomplish all of these functions at lower cost of equipment, with less training, and with lower risk to rescue personnel. Accordingly, the following disclosure provides embodiments of unmanned aerial rescue systems.

SUMMARY

In one embodiment, an unmanned aerial system, comprises: a frame; a landing member attached to the frame; a propulsion system support member attached to the frame; a propulsion system attached to the propulsion system support member; a shroud attached to the frame; a sealed equipment container attached to the frame; a control system within the sealed equipment container; a power source within the sealed equipment container; and a sensor system within the sealed equipment container, wherein the controls system is configured to be powered by the power source and to control the propulsion system and the sensor system.

In some embodiments, the shroud includes a parabolic portion.

In some embodiments, the unmanned aerial system further comprises: a light system.

In some embodiments, the unmanned aerial system further comprises: a sound system.

In some embodiments, the light system comprises a light emitter located on a top portion of the sealed equipment container.

In some embodiments, the sound system comprises a sound capturing device located on a top portion of the sealed equipment container.

In some embodiments, the sound system comprises a sound emitting device located on a top portion of the sealed equipment container.

In some embodiments, the shroud comprises a reflective inner surface.

In some embodiments, the light emitter located on a top portion of the sealed equipment container is located near a focal point of the parabolic portion of the shroud.

In some embodiments, the sound capturing device located on a top portion of the sealed equipment container is located near a focal point of the parabolic portion of the shroud.

In some embodiments, the sound emitting device located on a top portion of the sealed equipment container is located near a focal point of the parabolic portion of the shroud.

In some embodiments, the unmanned aerial system further comprises: a propulsion system shield attached to the propulsion system support member, wherein the propulsion system comprises at least one electric motor connected to at least one propeller.

In some embodiments, the at least one electric motor is connected to a gimbal, and wherein the gimbal is controllable by the control system and configured to change the orientation of the at least one electric motor and thereby the orientation of the at least one propeller.

In some embodiments, the unmanned aerial system further comprises: a rescue equipment carrier; and a rescue equipment release mechanism, wherein the rescue equipment release mechanism is controllable by the control system and configured to release a piece of rescue equipment from the rescue equipment carrier.

In some embodiments, the unmanned aerial system further comprises: a retractable line mechanism configured to controllably lower the piece of rescue equipment from the unmanned aerial system.

In some embodiments, the sound capturing device is a microphone.

In some embodiments, the sound emitting device is a speaker.

In some embodiments, the sealed equipment container comprises a transparent portion, and the sensor system comprises at least one image sensor oriented to receive image data through the transparent portion of the sealed equipment container.

In some embodiments, the shroud comprises a plurality of photovoltaic cells on an outer surface of the shroud, and wherein the plurality of photovoltaic cells are configured to produce electric current for the unmanned aerial system.

In another embodiment, an unmanned aerial system, comprises: a frame; a plurality of landing members connected to the frame; an electronic control system; a plurality of electric motors, each electric motor of the plurality of electric motors connected to a rotor, each electric motor of the plurality of electric motors configured to be controlled by the electronic control system; a plurality of mesh rotor shields, each rotor shield of the plurality of rotor shields encompassing one of the plurality of electric motors and its connected rotor; a sealed equipment container connected to the frame and encompassing the electronic control system; a parabolic shroud connected to the frame; a plurality of external equipment carriers, each external equipment carrier of the plurality of external equipment carriers attached to the frame and configured to carry a piece of rescue equipment; an equipment release mechanism for each of the respective external equipment carriers, each equipment release mechanism configured to release a piece of rescue equipment from its respective external equipment carrier; a light system comprising at least one light emitter; a sound system comprising at least one sound capturing device and at least one sound emitter; a sensor system comprising at least one image capturing device; and a data communication system comprising at least one antenna and at least one transceiver, wherein the electronic control comprises: one or more processors; one or more memories comprising processor-executable software configured to be executed by the one or more processors.

DETAILED DESCRIPTION OF CERTAIN INVENTIVE EMBODIMENTS

Figure 1:
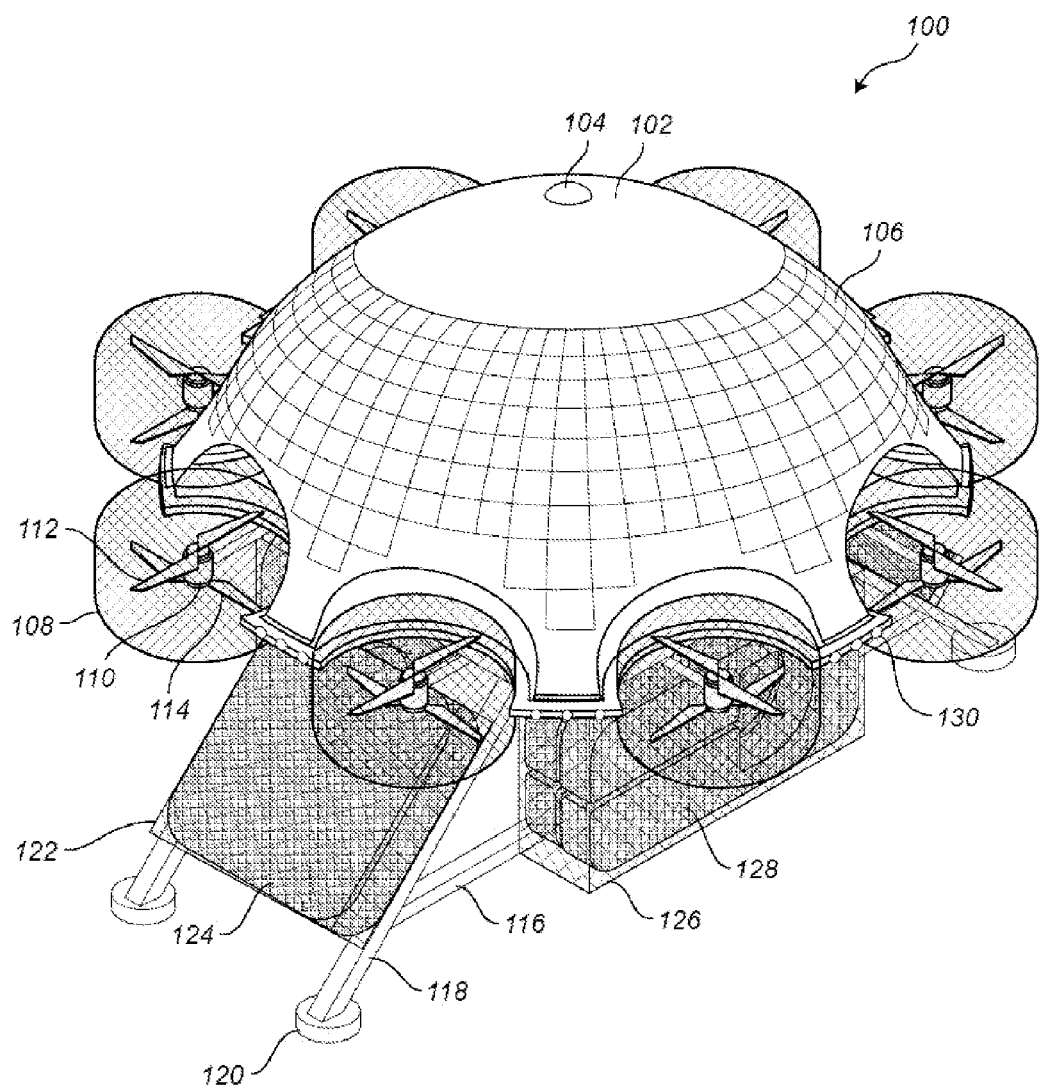
FIG. 1 depicts an exemplary embodiment of an unmanned aerial rescue system.

Embodiments disclosed in this application relate to unmanned aerial rescue systems. Generally speaking, unmanned aerial rescue systems are remotely or autonomously controlled flying vehicles or platforms capable of providing and deploying different forms of rescue equipment and assistance to individuals in need of assistance.

Embodiments of unmanned aerial rescue systems may comprise several components, including, for example: a frame or chassis, a landing member (e.g. landing leg), a control system, a propulsion system (e.g. a motor and propeller assembly), a propulsion system support member (e.g. a frame extension arm), a propulsion system orientation mechanism (e.g. a gimbal), a propulsion system shield (e.g. a mesh rotor shield), a sealed equipment container, a cover or shroud, an equipment carrier, an equipment release mechanism, a navigation system, a sensor system, a sound system, a light system, a data communication system, an emergency equipment system, and a power management system.

Structural System

Embodiments of unmanned aerial rescue systems may comprise a frame or chassis i.e. an internal framework that supports aspects of the unmanned aerial rescue system. The frame may be made of any suitable material, as are known in the art. Preferably, the frame is made of a lightweight, rigid material, such as a metal (e.g. aluminum and titanium), a plastic (e.g. ABS), a composite (e.g. carbon fiber) or hybrid combinations thereof. If an unmanned aerial rescue system is to be used near or over water, and in particular salt water, the frame may preferably comprise a material that does not corrode in the presence of water, or may be treated with a surface coating (e.g. powder-coating and rubberized-coating) in order to prevent environmental corrosion.

In some embodiments, the frame may comprise multiple frame portions, such as an upper frame portion and a lower frame portion. Each portion of the frame may be configured to attach to and carry different portions of the unmanned aerial rescue system. Further, each portion of the frame may be configured to attach to the other portion, or other portions, in order to form an integral unmanned aerial rescue system.

The frame may be attached to or integral with one or more propulsion system support members. A propulsion system support member may comprise a rigid member attached to or integral with and extending from the frame so as to space the propulsion system away from the frame. For example, where a propulsion system comprises propellers, it may be necessary to extend the propellers away from the frame so as not to impact the frame during operation. The propulsion system support members may be made from lightweight, rigid materials such as those comprising the frame or from different materials as are known by those of skill in the art.

The frame may also be attached to one or more landing members. In some embodiments, a landing member may comprise a landing leg or a landing strut or the like. The landing member may be configured to support the unmanned aerial rescue system when it is not airborne and may be further configured to cushion the impact of landing the unmanned aerial rescue system. In some embodiments, the landing member may be attached to the frame by way of a shock absorbing feature, such as a shock or spring. In further embodiments, the landing member may be attached to an actuator (e.g. a servo or electric motor), such that the landing member may be moved from a deployed position (e.g. during takeoff and landing) to a retracted position (e.g. during flight or water landing). In some embodiments, the landing member may comprise one or more wheels.

In some embodiments, the landing members may include integral landing pads that include contacts, such as charging contacts. In this way, the unmanned aerial rescue system may land on, or otherwise be placed on, a special charging pad that interfaces with the conductive contacts on the landing members in order to transfer power to the unmanned aerial rescue system's power system (e.g. to charge an onboard power source). In yet other embodiments, the landing members may include integral inductive charging features, so that when the unmanned aerial rescue system lands on or is otherwise placed on an appropriate charging pad, power is transferred inductively to the unmanned aerial rescue system's power system.

The frame may also be attached to a sealed equipment container or casing. In some embodiments, the sealed equipment container may be a structural member of the frame and provide support for other aspects of the unmanned aerial rescue system. The sealed equipment container may comprise the electronic systems of the unmanned aerial rescue system and may be sealed from environmental elements. In some embodiments, the sealed equipment container may be completely waterproof. The sealed equipment container may include various ports, such as connection ports, so that external systems may be connected. For example, the sealed equipment container may include data ports for connection to remote electronic system (e.g. sensors, lights, etc.). The sealed equipment container may also include power ports for connection to remote systems (e.g. propulsion). The sealed equipment container may also include integral features on the outer surface, such as lighting and sound systems. The sealed equipment container may also include light-transparent portions so that, for example, visible, infrared, and other light may pass through to sensors housed within the sealed equipment container.

In some embodiments, the sealed equipment container may be attached or mounted to the frame by shock absorbing members, such as rubberized brackets or bushings, in order to reduce vibration from the other operational systems, such as the propulsion system. In other words, the sealed equipment container may be attached in such a way as to isolate sound and other vibrations from other aspects of the unmanned aerial rescue system.

In some embodiments, the sealed equipment container may include vents so that pressure inside the sealed equipment container is equalized with pressure outside. Further, the vents may allow for cooling of equipment by dissipating heat within the sealed equipment container. In some embodiments, the vents may be capable of being opened or closed either manually or electronically depending on environmental conditions.

In some embodiments, the sealed equipment container may act as a flotation device if the unmanned aerial rescue system lands on water. Critically, because the sealed equipment container is sealed, none of the sensitive equipment within would be damaged if the unmanned aerial rescue system landed on water. Further, the sealed equipment container protects the sensitive equipment within from inclement environmental conditions, such as rain, snow, wind, water spray, smoke, dust, sand, and others as rare known in the art.

In some embodiments, the sealed equipment container may include one or more container parts, including, for example, a removable access door, panel, lid, or the like. In this way, the sealed equipment container may be opened so that the equipment stored within may be accessed. In some embodiments, the container parts (e.g. an access panel) may include a gasket or seal or the like so that sealed equipment container can be closed and sealed after the internal components are accessed.

The sealed equipment container may be made of many types of materials, such as metals, plastics, composites, and others as are known in the art. Preferably, the sealed equipment container is made from a material that does not corrode in the presence of water, or may be treated with a surface coating (e.g. powder-coating and rubberized-coating) in order to prevent environmental corrosion. Further, the sealed equipment container may be preferably radio frequency (RF) transparent so that signals may be broadcast and received from equipment within the sealed equipment container.

The frame may also be attached to one or more external equipment carriers, such as a basket, crate, bin, cradle, box or the like. In some embodiments, the external equipment carriers may be integral with the frame, while in others, the external equipment carriers may be attached to the frame and capable of actuation. For example, in some embodiments, the external equipment carriers may be deployed and retracted as with or independent from the landing members. As with the landing members, the external equipment carriers may be deployed or retracted using actuation devices, such as electric servos, electric motors, and other types of actuators as are known in the art.

The frame may also be attached to a shroud. The shroud may be formed to substantially cover the frame and the sealed equipment container as well as substantial portions of the propulsion system support members.

In some embodiments, the shroud may include transparent portions so that one or more image sensors or other sensors mounted within the shroud may see out from the shroud.

In some embodiments, the shroud is generally parabolic in shape. In other words, the whole or some portion of the shroud may have a cross section in the form or outline of a parabola and/or the surface itself may be a paraboloid surface. As such, the shroud may include one or more focal points based on the particular shape of the parabolic shroud surface and may thus form a parabolic reflector. In this way, the shroud may increase the effectiveness of other onboard systems. For example, the shape of the shroud may act to concentrate sound coming from below or around the unmanned aerial rescue system onto one or more sound capturing devices (e.g. microphones) underneath shroud. In some embodiments, the one or more sound capturing devices may be installed directly on top of the sealed equipment container and may include gaskets or seals or the like to maintain the seal of the sealed equipment container even when installed.

As another example, the generally parabolic shape of the shroud may act to concentrate or disperse light emanating from one or more light sources under the shroud. In some embodiments, the light sources (e.g. LED lights) may be installed directly on top of the sealed equipment container and, as above, may include proper seals in order to maintain the seal of the sealed equipment container. In some embodiment, the inner surface of the shroud may be reflective so as to increase the reflectivity of any light source under the shroud. In such embodiments, the reflectiveness may be provided by include a surface treatment, such as an aluminized mylar covering, or other reflective coating.

As yet another example, the generally parabolic shape of the shroud may act to concentrate or disperse sound emanating from a sound source under the shroud, such as one or more speakers under the shroud. In some embodiments, the sound sources may be installed on top of the sealed equipment container and, as above, may include proper seals in order to maintain the seal of the sealed equipment container.

In some embodiments, the shroud may also include integral power regeneration features, such as photovoltaic (i.e. solar) cells. The shroud may also include one or more integral light features, such as, for example, a strobe light, a navigation light, or other lights as are known in the art. The shroud may also include integral data and power infrastructure, such as integral wiring for connecting features of the shroud to equipment within the sealed equipment container.

The shroud may also include integral data communication features, such as antennas. In some embodiments, the antenna may be thin film antenna attached to or integral with the inner or outer surface of the shroud.

In some embodiments, structural features of an unmanned aerial rescue system, such as the frame, the landing member, the sealed equipment container, the external equipment carrier, and the shroud may be made or formed by additive manufacturing techniques, such as 3D printing by fused deposition modeling (FDM), fused filament fabrication (FFF), direct metal laser sintering (DMLS), electron-beam melting (EBM), selective laser melting (SLM), selective heat sintering (SHS), selective laser sintering (SLS), stereolithography (SLA), and others as are known in the art.

Propulsion System

Embodiments of unmanned aerial rescue systems may comprise a propulsion system including, for example, electric motors. The electric motors may be attached to the aforementioned propulsion system support members so that the motors are placed away from the main frame of the unmanned aerial rescue system to allow clearance for rotors to spin. The electric motors may be electrically connected to the aforementioned sealed equipment container in order to power and control the electric motors. The electric motors may be controlled independently by a control system of the unmanned aerial rescue system. In some embodiments, the electric motors are sealed or otherwise encased so as to be protected from the elements, such as water and dust.

In some embodiments, the electric motors may be connected directly (e.g. via drive shaft) or indirectly (e.g. via a transmission) to rotors or propellers or other types of spinning wings as are known in the art. The number and size of the rotors may vary based on particular lift, flight time, environmental, and other operational needs. For example, in some embodiments, each electric motor may be connected to a rotor comprising between two and eight individual rotor blades. Further, in some embodiments, the rotors may be connected to a rotor disc such that the pitch of the rotors may be changed by actuators connected to the rotor disc.

In some embodiments, each propulsion system support member may be attached to a plurality of (e.g. two) motors. For example, in some embodiments, a propulsion system support member may be attached to at least two motors. In embodiments with two electric motors attached to a single propulsion system support member, the electric motors may be arranged in opposite directions relative to each other, such as one pointing down and one pointing up. In this way, the propulsion system can use counter-rotating pairs of rotors to increase lift when operating concurrently. In other embodiments, a single electric motor may be connected to a transmission which connects to two or more drive shafts driving two or more rotors, which may be counter rotating.

In some embodiments, the rotors are coplanar. Further, in embodiments with rotors oriented in different directions (e.g. up and down), there may be more than one plane of co-planar rotors (such as a top plane and a bottom plane). In some embodiments, the rotors are co-planar in one position, but the direction of the rotors may be actuated.

In some embodiments, one or more electric motors may be connected to a gimbal i.e. a pivoted support that allows the rotation of an object, such as an electric motor, about an axis. The gimbal itself may be attached to a propulsion system support member and may further be connected to an actuator so as to rotate the gimbal. For example, an actuator may rotate the gimbal in order to change the direction of an attached electric motor in order to change the flight characteristics of an unmanned aerial rescue system.

In some embodiments, the electric motors may be positioned in-board, i.e. within the shroud and may drive rotor assemblies by way of drive shafts and other gear assemblies.

In some embodiments, the propulsion system may include one or more rotor shrouds such that the rotor and the shroud together form a ducted fan. In some embodiments, the shroud may encompass more than one rotor, such as two or more counter-rotating rotors.

In some embodiments, the rotors may be encompassed by a propulsion system shield, such as a rotor or propeller mesh shield. For example, the mesh can be a substantially open mesh so that it does not significantly impact airflow to the propulsion system elements while still providing impact protection to those elements. In some embodiments, for example, the mesh openings may be between 0.1 and 1 inch in diameter. The propulsion system shield may be attached to, for example, a propulsion system support member and may be configured to be larger than the radius of any rotor or propeller or other moving part within the propulsion system shield. The propulsion system shield may protect the rotor or propeller from impacting objects or impediments during flights, such as birds or other animate or inanimate obstacles. In some embodiments, a propulsion system shield may be easily removable so as to be an optional feature depending on the particular use or mission of the unmanned aerial rescue system. For example, the propulsion system shield may be removed to save weight where the chances of object impacts is relatively low.

Navigation System

Embodiments of unmanned aerial rescue systems may comprise a navigation system. The navigation system may acquire and use location data in order to determine the location of the unmanned aerial rescue system. The navigation system may also send navigational command data to the control system (discussed below) in order to navigate the unmanned aerial rescue system along a selected path, route, plan or the like.

The navigation system may include or collect data from one or more sensors, such as: a position sensor, an attitude sensor, a multi-axis accelerometer, a gyroscopic sensor, a compass sensor, an altimeter, and others as are known in the art. In some embodiments, one or more sensors associated with the navigation system are within the sealed equipment container.

The navigation system may determine location data using one or more processors and one or more sensors or systems. For example, a navigation system may have an inertial navigation subsystem, which uses a processor, motion sensors (accelerometers) and rotation sensors (gyroscopes) to continuously calculate via dead reckoning the position, orientation, and velocity (direction and speed of movement) of a moving object without the need for external references. As another example, a navigation system may include a Global Positioning System (GPS) subsystem for receiving GPS location signals and determining a location based on the received signals. Location data may also be calculated using radio frequency antennas and radio triangulation methods as are known in the art. In some embodiments, one or more of the aforementioned systems may be used in parallel in order to provide redundancy and to improve navigation system performance.

The navigation system may receive navigation path data stored in a memory or via the data communication system (discussed below). In some embodiments, the unmanned aerial rescue system comprises a memory configured to store pre-defined location data. In some embodiments, the navigation system may provide location information to a human pilot who remotely controls the unmanned aerial rescue system via a remote data connection, such as a wireless data connection.

Data Communication System

Embodiments of unmanned aerial rescue systems may comprise a data communication system. The data communication system may enable unidirectional and/or bidirectional data exchange from the unmanned aerial rescue system to, for example, a remote control system. For example, the unmanned aerial rescue system may send image (live and still) data to the remote control system over a high-capacity radio frequency data link. As another example, the unmanned aerial rescue system may send telemetry data regarding the operation of the vehicle to the remote control system. As yet another example, the unmanned aerial rescue system may receive command and control information from the remote control system, such as navigational commands, system operation commands (e.g. deploying or retracting features of the unmanned aerial rescue system), sound data (e.g. to speak remotely through the unmanned aerial rescue system's sound system), and others. Notably, a remote control system can be located in a fixed location, such as an operations building, a mobile location, such as another vehicle or vessel, or a mobile device, such as a laptop computer, tablet computer, smartphone or the like.

The data communication system may include one or more antennas and one or more transceivers in order to transmit and receive data. For example, the unmanned aerial rescue system may include ultra-low, low, medium, and high-frequency antennas for data transmission and reception to terrestrial data links. The unmanned aerial rescue system may also include antenna for data transmission and reception from satellite-based data links. In some embodiments, the unmanned aerial rescue system may include one or more antennas for communicating with existing cellular data networks (e.g. 3G, LTE, and others as are known in the art). In some embodiments, the unmanned aerial rescue system may include one or more antennas for communicating with WiFi (e.g. IEEE 802.11) or Bluetooth data links.

In some embodiments, one or more of the antennas may be attached to or otherwise integral with the shroud (discussed above). Other antennas may also be located within, attached to, or otherwise integral with the sealed equipment container (discussed above).

Embodiments of the data communication system may include electrical connections (e.g. on a data bus) to the control system (described below) in order that data may be transmitted from and received at the control system.

In some embodiments, the control system may monitor various data links, such as those described above, and select the most appropriate or best data link depending on the circumstances. For example, the unmanned aerial rescue system may selectively send high-priority data (e.g. video data) over a high-power data link, such as a satellite data link, and selectively send low-priority data (e.g. telemetry data) over a low-power data link, such a terrestrial radio link. Notably, the aforementioned priorities of the aforementioned data types are exemplary only. Different data types may transition between levels of priority during different parts of a flight plan, mission, or the like.

Sound System

Embodiments of unmanned aerial rescue systems may comprise a sound system. Embodiments of a sound system may include one or more sound emitting devices, such as speakers. In some embodiments, the one or more sound emitting devices may be attached to or integral with the sealed equipment container (described above) or the frame. In some embodiments, the one or more sound emitting devices may be sealed or otherwise encased so as to be water-resistant or water-proof. In some embodiments, the one or more sound emitting devices may be arranged so as to direct sound in a particular direction, such as below the unmanned aerial rescue system. In some embodiments, the shroud is used as a sound reflecting and amplifying surface so that a relatively small sound emitting device may project sound from the unmanned aerial rescue system at long distances with sufficient volume and clarity. In such embodiments, the one or more sound emitting devices may be placed at or near a focal point of the shroud. Those of skill in the art will understand that because a focal point is generally a single point in space, that in general only a single device could be placed at the focal point. However, more than one device may be placed near the focal point so as to take advantage of the properties of the parabolic shroud.

Embodiments of a sound system may also include one or more sound capturing devices, such as microphones, for receiving sounds. In some embodiments, the one or more sound capturing devices may be arranged so as to receive concentrated sound from a particular direction, such as from below the unmanned aerial rescue system. In some embodiments, the shroud is used as a sound reflecting and amplifying surface so that sound emanating from below the unmanned aerial rescue system is directed toward and concentrated on or near the sound capturing device. In such embodiments, the one or more sound capturing devices may be placed at or near a focal point of the shroud.

Embodiments of the sound system may include hardware and/or software configured to process received sound data and to filter out unwanted noise. For example, a sound processing subsystem may greatly reduce background noise from operation of the unmanned aerial rescue system, such as from the sound of the electric motors and rotors during operation.

Embodiments of the sound system may include data connections to the control system (described below). Further, aspects of the sound system, such as a sound amplifier, a sound processor, and others as are known in the art, may be included with the unmanned aerial rescue system.

Light System

Embodiments of unmanned aerial rescue systems may comprise a light system. Embodiments of a light system may include one or more light emitters (e.g. incandescent, halogen, fluorescent, neon, laser, or LED lights). In some embodiments, the one or more light emitters may be attached to or integral with the sealed equipment container (described above) or the frame. For example, a spot light or flood light may be attached to the sealed equipment container. In some embodiments, one or more light emitters may be attached to or integral with the frame. For example, one or more navigation lights may be attached to the frame. In some embodiments, one or more light emitters may be attached to the shroud. For example, one or more navigational lights or beacon lights may be attached to the shroud.

In some embodiments, the one or more light emitters may be sealed or otherwise encased so as to be water-resistant or water-proof. In some embodiments, the one or more light emitters may be arranged so as to direct light in a particular direction, such as below the unmanned aerial rescue system. In some embodiments, a surface of the shroud, such as an inner surface, is used as a light reflecting and amplifying surface so that a relatively small light emitter may project light from the unmanned aerial rescue system at long distances with sufficient intensity. In such embodiments, the one or more light emitters may be placed at or near a focal point of the shroud.

In some embodiments, one or more light emitters may be configured to emit visible light. Further, in some embodiments, one or more light emitters may be configured to emit non-visible light, such as infrared light. Infrared light, for example, may be used in conjunction with an image sensor to illuminate an area below the unmanned aerial rescue system to improve the performance of onboard sensors, such as an infrared camera.

Embodiments of the light system may include data connections to the control system (described below). Further, aspects of the light system, such as a power amplifier, a light control processor, a ballast, and others as are known in the art, may be included with the unmanned aerial rescue system.

Sensor Systems

Embodiments of unmanned aerial rescue systems may comprise one or more sensors or sensor systems.

For example, an unmanned aerial rescue system may include one or more live or still image sensors, laser scanners, infrared scanners, radar, sonar, chemical sensors, temperature sensors, pressure sensors, distance sensors, altitude sensors, proximity sensors, magnetic field sensors, orientation sensors, acceleration sensors, environmental sensors, and others as are known in the art.

In some embodiments, the one or more sensors may be within, attached to, or integral with the sealed equipment container (described above) or the frame. For example, image sensors such as video cameras may be within the sealed equipment container and oriented so as to look down and see through a transparent portion of the sealed equipment container. Image sensors, laser scanners, infrared scanners, radar, and the like may be used to locate objects, including a person, during a search mission. In some embodiments, the image data provided by such sensors may be analyzed by object recognition software in order to autonomously search for and locate objects, such as a person.

Other sensors, such as chemical or environmental sensors may be outside of the sealed equipment container and may include electrical connections to equipment within the sealed equipment container.

In some embodiments, the one or more sensors may be connected to other systems, such as the control system, via data and power connections.

Power System

Embodiments of unmanned aerial rescue systems may comprise a power system. Embodiments of a power system may comprise a power source, such as a battery. Embodiments of a power source may store energy for powering an unmanned aerial rescue system. In some embodiments, the power source is a lithium-ion battery. In other embodiments, the power source may be other types of batteries. Embodiments of a power source may also include a fuel cell. Preferably, the power source has a high energy-to-weight ratio.

Embodiments of a power system may also comprise a regenerative power system. For example, an unmanned aerial rescue system may comprise photovoltaic cells in order to charge the power source while operating and while idle (e.g. while on the ground). In some embodiments of the unmanned aerial rescue system, the shroud is partially or fully covered with thin film photovoltaic cells to capture ambient light and to convert the light into power for the operation of the unmanned aerial rescue system.

Embodiments of a power system may also comprise a charging system. For example, an unmanned aerial rescue system may include conductive contacts or inductive coils to charge the power source while the unmanned aerial rescue system is idle. In some embodiments, for example, the conductive contacts or inductive coils may be attached to or integral with the landing members or landing pads of the unmanned aerial rescue system. In some embodiments, the conductive contacts may be configured to contact special charging pads on a landing pad for the unmanned aerial rescue system. In these ways, the unmanned aerial rescue system may land and automatically recharge its power source without further operator interaction.

Embodiments of a power system may also comprise a power bus as well as power conditioning and conversion equipment (e.g. capacitors, rectifiers, inverters, etc.) as are well known in the art. In some embodiments, the power system may comprise at least two power busses: one for high voltage connections (e.g. for the electric motors) and one for low voltage connections (e.g. for processors, sensors, and other control circuitry).

Rescue Equipment System

Embodiments of unmanned aerial rescue systems may comprise a rescue equipment system. Embodiments of a rescue equipment system may comprise external equipment carriers configured to carry rescue equipment, such as food, water, clothing, inflatable devices, floatation devices, Inflatable Buoyant Apparatuses (IBA), life vests, and other rescue or emergency equipment.

In some embodiments, an unmanned aerial rescue system has one or more external equipment carriers configured to carry rescue equipment and actuators configured to selectively deploy or release that equipment from each external equipment carrier. For example, an external equipment carrier may have an electronically actuated latch that releases a piece of rescue equipment from the external equipment carrier. The electronically controlled actuators may be connected to the control system (described below) in order to control the deployment of the rescue equipment.

Embodiments of a rescue equipment system may include a tether line system. The tether line system may be connected to a piece of rescue equipment, for example, a floatation device, and may be used to tether the rescue equipment to the unmanned aerial rescue system. For example, if a piece of rescue equipment were deployed into a body of water with moving current, the tether line connected between the unmanned aerials rescue system and the piece of rescue equipment could prevent the piece of rescue equipment from drifting away. In this way, the deployment of the rescue equipment may be more controlled after deployment as compared to just releasing the rescue equipment.

Embodiments of a rescue equipment system may include a retractable line system. The retractable line system may be connected to a piece of rescue equipment, for example, a floatation device, and may be used to lower the rescue equipment from the unmanned aerial rescue system to, for example, a person in need. In this way, the deployment of the rescue equipment may be more controlled as compared to just releasing the rescue equipment. Moreover, where the rescue equipment may be sensitive to impact, the retractable line system may allow an operator to lower the rescue equipment to a surface without damaging the rescue equipment.

In some embodiments, the line used to tether or lower the rescue equipment may be a lightweight, high-strength line, such as a polyurethane line, a nylon line, a metal line, or other types of lines as are known in the art. In some embodiments, the line may include an elastic member at the end of the line so that movements of the unmanned aerial rescue system during deployment of the rescue equipment are damped. Similarly, the elastic member may prevent a recipient of the rescue equipment from pulling on the line and damaging the unmanned aerial rescue system, or causing it to exit controlled flight. The retractable line system may be connected to the control system (described below) in order to control the deployment of the line and any attached rescue equipment.

In some embodiments of the tether or retractable line systems, the end of the line carrying the rescue equipment may comprise a latch. In some embodiments, the latch may be controllable so that the unmanned aerial rescue system can lower rescue equipment to a surface and release it without human interaction. In some embodiments, the latch is an electro-magnetic latch that can be energized or de-energized in order to hold or release a piece of rescue equipment. In some embodiments, the power and control signals for the remote latch may be individual lines within a braided line.

Control System

Embodiments of unmanned aerial rescue systems may comprise a control system. Embodiments of a control system may include one or more processors, one or more memories, one or more data interfaces, and other circuitry as are known in the art. Embodiments of the control system may implement control software embodied in computer-readable media. Embodiments of the control system may interact with other systems of the unmanned aerial rescue system by receiving data from those other systems, processing the data, and sending control data or signals to those systems.

For example, the control system may be in data communication with a navigation system and receive location and navigation data from the navigation system. In return, the control system may provide navigational instructions to the navigation system based on, for example, commands received from a remote operator via the data communication system. Similarly, the control system may transmit location data received from the navigation system to a remote operator via the data communication system.

As another example, the control system may send control data to the propulsion system to control the speed of one or more of the electric motors, the orientation of an electric motor if connected to a gimbal or other articulable mount, and the pitch of a rotor if connected to an articulable rotor disc. The control data sent to the propulsions system may cause the unmanned aerial rescue system to make certain types of movements, such as pivoting about a pitching axis in order to move forwards or backwards; pivoting about a roll axis in order to move to the right or to the left; pivoting about a yaw axis in order to cause the main axis of the unmanned aerial rescue system to turn to the right or the left; and move in translation downwards or upwards.

The control system may also receive operational data from the propulsion system, such as speed of an electric motor, temperature of an electric motor, current draw of an electric motor, orientation of an electric motor, and others as are known in the art. In some embodiments, the control system may implement automatic flight modes, such as automatic stabilization of the unmanned aerial rescue system during a hovering flight mode, as described, for example, in PCT Publication No. WO 2009/109711, which is hereby incorporated by reference in its entirety.

The control system may also send control data to the propulsion system in order to implement various modes of piloting the unmanned aerial rescue system, such as by remote-control or autonomously.

As another example, the control system may send control data and sound data to the sound system so as to cause one or more sound emitting devices of the unmanned aerial rescue system to produce audible sounds. The control system may also receive sound data from one or more sound capturing devices of the unmanned aerial rescue system. For example, the control system may use both sound emitting devices and sound capturing devices of the sound system in order to create a two-way communication link between the a remote operator and a person in need of assistance by way of the data communication system on the unmanned aerial rescue system.

As another example, the control system may send control data to the light system so as to cause one or more light emitters to activate. For example, the control system may activate navigation lights on the unmanned aerial rescue system during flight as well as a beacon light during flight. The control system may also activate one or more light emitters under the shroud in order to produce a light effect below the unmanned aerial rescue system. The control system may also activate light emitters, such as infrared light emitters, in connection with sensor systems, such as an infrared imaging system.

As another example, the control system may send control data to the rescue equipment system. For example, the control system may cause a piece of rescue equipment to be deployed by, for example, releasing it from an external equipment carrier, or by lowering it using a retractable line system.

As another example, the control system may send control data to sensor systems to activate them. The control system may further receive and process sensor data from various sensor systems. The control system may use the received sensor data to affect its own operation or may provide the received sensor data to a remote operator by way of the data communication system. The control system may also receive operational data from the sensor systems, such as the status of any particular sensor.

As another example, the control system may send control data to the power system to control the use of the power source and the charging of the power source both when idle (e.g., via ground-based power connection or photovoltaic power generation) or during flight (e.g., via photovoltaic power generation). The control system may also receive operational data from the power system, such as the status of the power source (e.g., remaining charge of the battery), the amount of power generation (e.g., from the photovoltaic cells), the speed of charging and remaining charge time (e.g., when connected to a ground-based power supply), and others as are known in the art.

The control system may receive control data from a remote control system, as described above. A remote control system may comprise a remote control client software coupled to the unmanned aerial rescue system via a data communication link. The remote control system may be, for example, a laptop computer, a tablet computer, a smartphone, etc. The remote control system may include a central processing unit (CPU), a graphics processing unit (GPU), and a computer-readable memory, such as a computer-readable non-transitory storage device that may include both persistent (e.g., a hard disk) and non-persistent (e.g., RAM) memory components, and may store instructions executable on the CPU and/or the GPU. The memory may store location data, operational data, and sensor system data received from the unmanned aerial rescue system.

The remote control system may also include a user interface including a touch interface, voice interface, and others as are known in the art. In some embodiments, the touch interface may include a touchpad over which the user moves his fingers while looking at a separately provided screen, a touchscreen where the user places his fingers directly over the image being manipulated or over a displayed control being activated (e.g. a displayed keyboard), etc. In some embodiments, the voice interface may include any device that includes a microphone, such as a Bluetooth ear piece, a smartphone, etc.

Exemplary Embodiment

FIG. 1 depicts an exemplary embodiment of an unmanned aerial rescue system 100. Unmanned aerial rescue system 100 includes a parabolic shroud 102 that covers the majority of the unmanned aerial rescue system 100. As such the parabolic shroud 102 provides protection to internal components from the environment as well as improves the aerodynamic characteristics of the unmanned aerial rescue system 100 during flight.

Parabolic shroud 102 includes an array of photovoltaic cells (i.e. solar cells) 106. The array of photovoltaic 106 cells may be monocrystalline, polycrystalline, or other configurations as are known in the art. The array of photovoltaic 106 cells provides power to the power system while operating and while idle. In some embodiments, the array of photovoltaic 106 cells may provide power directly to the power system for distribution to other systems in the unmanned aerial rescue system 100, while in others it may provide dedicated power to specific sub-systems, such as the lighting system.

Parabolic shroud 102 includes a light emitter 104, which may be used as a beacon light during operations. For example, the light emitter 104 may be configured to blink at set intervals in order to visually broadcast its location during operations. Light emitter 104 is part of the light system and controlled by the control system. In some embodiments, light emitter 104 is a high-intensity strobe light.

Unmanned aerial rescue system 100 includes eight (8) electric motor assemblies 110 connected to eight propulsion system support members. The eight electric motor assemblies 110 are connected to two sets of counter rotating propeller assemblies 112 and 114. For example, in the depicted embodiment, the top propeller assembly 112 attached to each motor assembly 110 may rotate in a clockwise direction while the lower propeller assembly 114 may rotate in a counter-clockwise direction. In other embodiments, the aforementioned rotational directions may be reversed or they may rotate in the same direction. Notably, other embodiments may include different numbers of electric motor assemblies and propeller assemblies.

Unmanned aerial rescue system 100 also includes eight (8) propulsion system shields 108 (one for each electric motor assembly) connected to the eight propulsion system support members. In the depicted embodiment, each propulsion system shield 108 is a mesh shield made of a strong, lightweight material, such as metal, and configured to provide operational clearance of the rotor assemblies (i.e. to allow the rotors to spin without interference) as well as crush clearance (i.e. to allow the rotors to spin without interference even after an impact with an object that deforms the propulsion system shield).

Unmanned aerial rescue system 100 also includes four (4) fixed landing members 118. In the depicted embodiment, each landing member 118 is a fixed landing strut or leg. In other embodiments, the landing members 118 may be moveable into a plurality of positions, such as an extended landing position or a retracted flight position, so as to improve the aerodynamic performance of the unmanned aerial rescue system 100 during flight. In such embodiments (i.e. where the landing members are moveable), the unmanned aerial rescue system 100 may include actuators (e.g. electric or hydraulic or pneumatic) to control the position of the moveable landing members. Further, in embodiments where the landing members are moveable, the landing members may be attached to shock absorbing assemblies, such as springs and shocks.

Unmanned aerial rescue system 100 also includes a landing pad 120 attached to each landing member 118. In some embodiments, the landing pads 120 may be formed of a shock absorbing material, such as rubber or plastic or others as are known in the art. In some embodiments, the landing members include integral electronic contacts on the bottom of the pads or inductive coils within the landing pads so that the unmanned aerial rescue system 100 may be connected to, for example, electric charging equipment automatically when landing on an appropriate landing pad (not shown). In embodiments that do not include landing pads 120, the electric contacts may instead be integral with the bottom of the landing members 118.

Unmanned aerial rescue system 100 also includes a cross member 116 connected between two landing members 118. The cross member 116 provides structural rigidity to the Unmanned aerial rescue system 100 and support for the landing members 118.

Unmanned aerial rescue system 100 also includes rescue equipment carriers 122 and 126, which each carry rescue equipment 124 and 128. In the depicted embodiment, rescue equipment 124 is an Inflatable Buoyant Apparatuses (IBA) and rescue equipment 128 is a life jacket flotation device. However, in other embodiments, rescue equipment carriers 122 and 126 may carry different types of rescue equipment, as described above.

Unmanned aerial rescue system 100 also includes light emitters 130. For example, light emitters 130 may be used for navigation lighting (e.g. red and green lighting as is required in other aerial vehicles). Light emitters 130 may also be used for directional navigation lighting. Light emitters 130 may be part of the light system discussed above and controlled by the control system.

Figure 2:
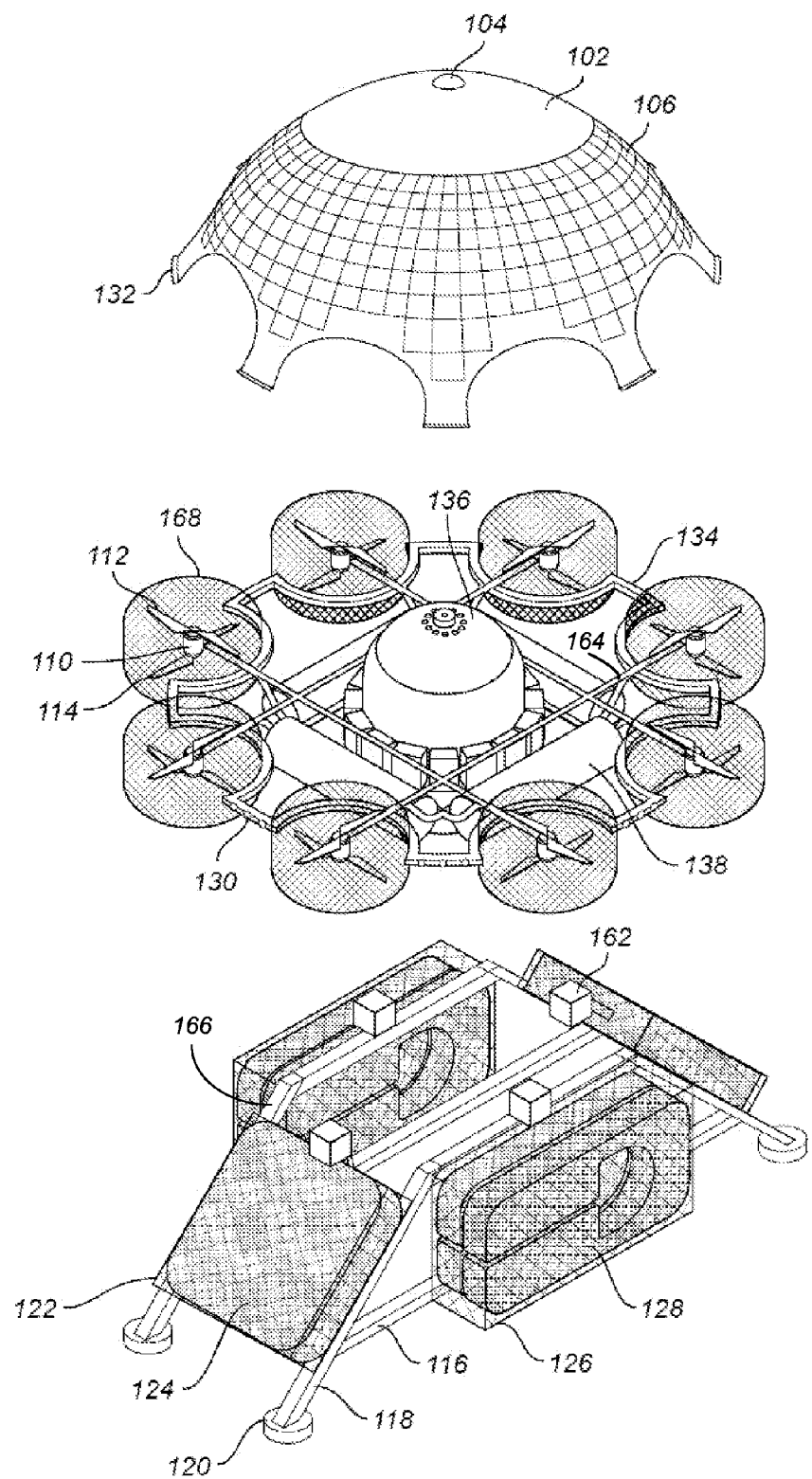
FIG. 2 depicts a partially exploded view of an exemplary embodiment of an unmanned aerial rescue system.

FIG. 2 depicts the unmanned aerial rescue system 100 of FIG. 1 in a partially exploded view. In particular, FIG. 2 depicts shroud 102 removed from upper frame assembly 134. Shroud 102 includes connection means 132 for connecting shroud 102 to the upper frame assembly 134, such as a latch, threaded screw hole, magnetic connection, or others as are known in the art. The connection means 132 may include integral electrical contacts or connectors so as to connect electrical systems attached to or integral with the shroud (e.g. light emitter 104, photovoltaic cells 106, antennas (not shown), and others) to the control system by way of electrical connection routes (e.g. wires) connected to the upper frame assembly 134 and sealed equipment container 136. Further, as with the sealed equipment container 136, the shroud 102 may be attached or mounted to upper frame assembly frame 134 by shock absorbing members, such as rubberized brackets or bushings, in order to reduce vibration from the other operational systems, such as the propulsion system.

In the embodiment depicted in FIG. 2, upper frame assembly 134 includes integral propulsion system support members 164, which connect to and supports sealed equipment container 136. Upper frame assembly 134 also connects to and supports flotation devices 138, which provide buoyancy to unmanned aerial rescue system 100 in the event of a water landing.

Upper frame assembly 134 connects with lower frame assembly 166, which in the depicted embodiment comprises cross-members 116 and landing members 118. Lower frame assembly 164 also includes rescue equipment deployment means 162. In some embodiments, rescue equipment deployment means may include a motorized spool and cable that is controllable by the control system in order to lower rescue equipment, such as rescue equipment 124 and 128, from the unmanned aerial rescue system 100 in a controlled fashion. In other embodiments, rescue equipment deployment means 162 may include a mechanical or magnetic latching mechanism that can hold and then controllably release the rescue equipment such that it falls away from the unmanned aerial rescue system 100. In yet other embodiments, rescue equipment deployment means 162 may include a tether line that can hold the rescue equipment after it falls away from the unmanned aerial rescue system 100. Notably, the aforementioned rescue equipment deployment means examples are merely exemplary, and other means for deploying the rescue equipment may also be used.

Figure 3:
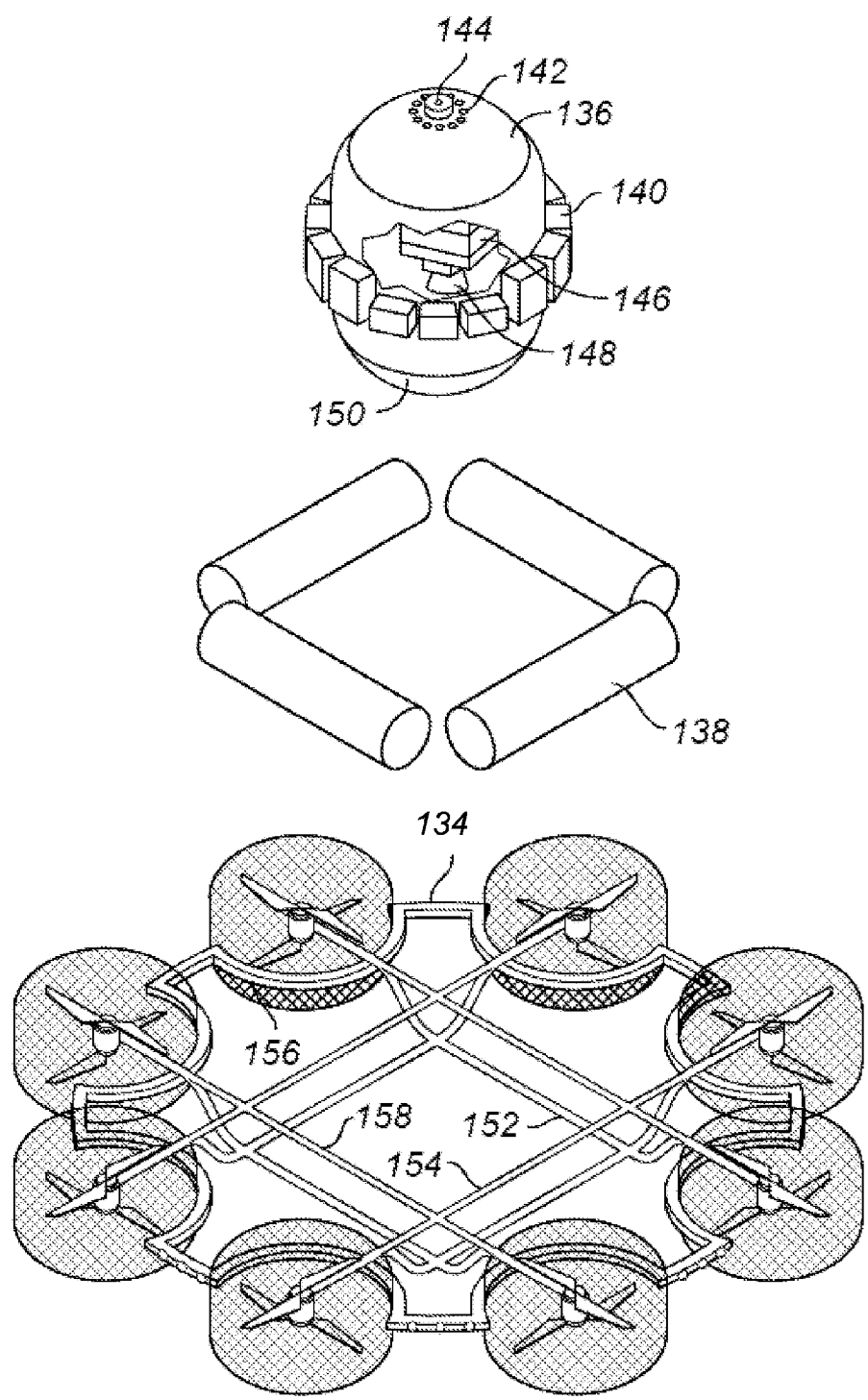
FIG. 3 depicts a partially exploded view of aspects of an exemplary embodiment of an unmanned aerial rescue system.

FIG. 3 depicts an exploded view of the upper frame assembly 134. The upper frame 134 includes a plurality of upper frame rails (e.g. 158 and 154) as well as lower frame rails (e.g. 152). The upper frame 134 also includes curved frame portions 156, which allow the propeller assemblies and the propulsion system shields to be positioned relatively more inboard with respect to the unmanned aerial rescue system 100.

Floatation devices 138 attach to upper frame assembly 134. As described above, floatation devices 138 provide buoyancy to unmanned aerial rescue system 100 in the event of a water landing. Notably, in some embodiments, floatation devices 138 are removable so as to save weight where unmanned aerial rescue system 100 is not operating over water.

FIG. 3 also depicts a partially cut-away view of sealed equipment container 136. As depicted, sealed equipment container 136 includes sound emitting and capturing device 144. In this embodiment, the sound emitting and capturing device 144 includes a microphone assembly in order to capture sound data. The sound emitting and capturing device 144 also includes a speaker assembly in order to emit sound. The sound emitting and capturing device 144 is positioned to be at or near a focal point of the shroud (not shown) such that the microphone assembly captures concentrated sound from outside the unmanned aerial rescue system 100 (for example, below the unmanned aerial rescue system 100). For example, positioning the microphone assembly in such a way may increase in intensity of the received sound therein increasing the range at which the microphone assembly of the sound emitting and capturing device 144 is able to make out sound. Additionally, positioning the speaker assembly of the sound emitting and capturing device 144 at or near a focal point of the shroud may increase the projection of the sound from the unmanned aerial rescue system 100.

Further, placing the sound emitting and capturing device 144 within the shroud 102 may shield it from operational noise produced by other aspects of the unmanned aerial rescue system 100, such as the electric motors and rotor assemblies. As such, position of the sound emitting and capturing device 144 near a focal point of shroud 102 may increase the overall performance of the sound system. Notably, while the sound emitting and capturing device 144 is shown as an integral system in a particular location, in other embodiments, the sound capturing (e.g. microphone) and sound emitting (e.g. speaker) aspects may not be co-located. Furthermore, the sound emitting and capturing system 144 may include a plurality of sound capturing and sound emitting devices.

Sealed equipment container 136 also includes a plurality of light emitters 142. In some embodiments, the light emitters are LED lights, though other types of light emitting devices may be used. As with the sound emitting and capturing device 144, in the depicted embodiment, light emitters 142 are located at or near a focal point of shroud 102. In the depicted embodiment, shroud 102 includes a reflective coating on the inner shroud surface. As such, the light emitted from light emitters 142 is reflected off the reflective inner shroud surface and concentrated in a downward direction. In this way, the shroud may increase the performance of the light emitters 142 with respect to illuminating objects below the unmanned aerial rescue system 100.

Sealed equipment container 136 also includes a plurality of modular attachments 140. In some embodiments, one or more of the modular attachments 140 are flotation devices. In such cases, the modular flotation devices add buoyancy to the unmanned aerial rescue system 100 in the event of a water landing. Modular attachments 140 may also contain, for example, sensor systems. Because different operations may require different sensor systems, modular attachments 140 may be attached to the sealed equipment container 136 in order to supplement the available sensor systems available for an operation. Modular attachments 140 may also include, for example, power storage devices, such as batteries. In this way, modular attachments may supplement a primary power source located within sealed equipment container 136. Modular attachments 140 may also include passive of active cooling elements, such as radiators, heat-sinks, fans, vents, and others so as to cool equipment within the sealed equipment container 136.

In some embodiments, modular attachments 140 may include connectors that interface with connectors on the outside of sealed equipment container 136, and which are water-resistant or water-proof.

Sealed equipment container 136 also includes a transparent section 150. Transparent section 150 allows image capturing systems, such as camera 148, to see through the sealed equipment container 136 without subjecting the image capturing systems to the surrounding environment. In some embodiments, transparent section 150 may include a surface treatment, such as a coating or a film, which affects light passing through the transparent section. For example, a surface treatment may polarize the incoming light in order that the image capturing system 148 has a clearer picture in watery environments. As another example, the surface treatment may restrict the amount of incoming light, such as a tinting film. As yet another example, the surface treatment may resist scratching and wear. Other surface treatments may be used as are known in the art.

Sealed equipment container 136 also encapsulates a plurality of electronic equipment 146, such as electronic equipment specific to each of the various electronic systems of unmanned aerial rescue system 100. Such electronic equipment may include, for example, sensors, computer processors, micro-controllers, power sources, power conditioning equipment, antennas, transceivers, and other equipment as is described throughout this disclosure. For example, the sealed equipment container 136 may encapsulate a control system including one or more central processing units (CPU), one or more computer-readable memories, such as a non-transitory storage devices (e.g., ROM or a hard disk) and non-persistent storage devices (e.g., RAM), which may store instructions executable on the CPU.

In some embodiments, unmanned aerial rescue system 100 is configured to weigh less than fifty-five (55) pounds in order to comply with regulations regarding the operation of unmanned aerial vehicles in public airspaces.

Notably, the embodiment of an unmanned aerial rescue system 100 described with reference to FIGS. 1-3 is exemplary only. Certain aspects may be added or omitted as known by those of skill in the art. Further, while many aspects of unmanned aerial rescue system 100 have been described in detail, many other aspects have been omitted. For example, FIGS. 1-3 do not depict wiring and other data and power infrastructure. However, those of skill in the art know how to implement such details.

Figure 4:
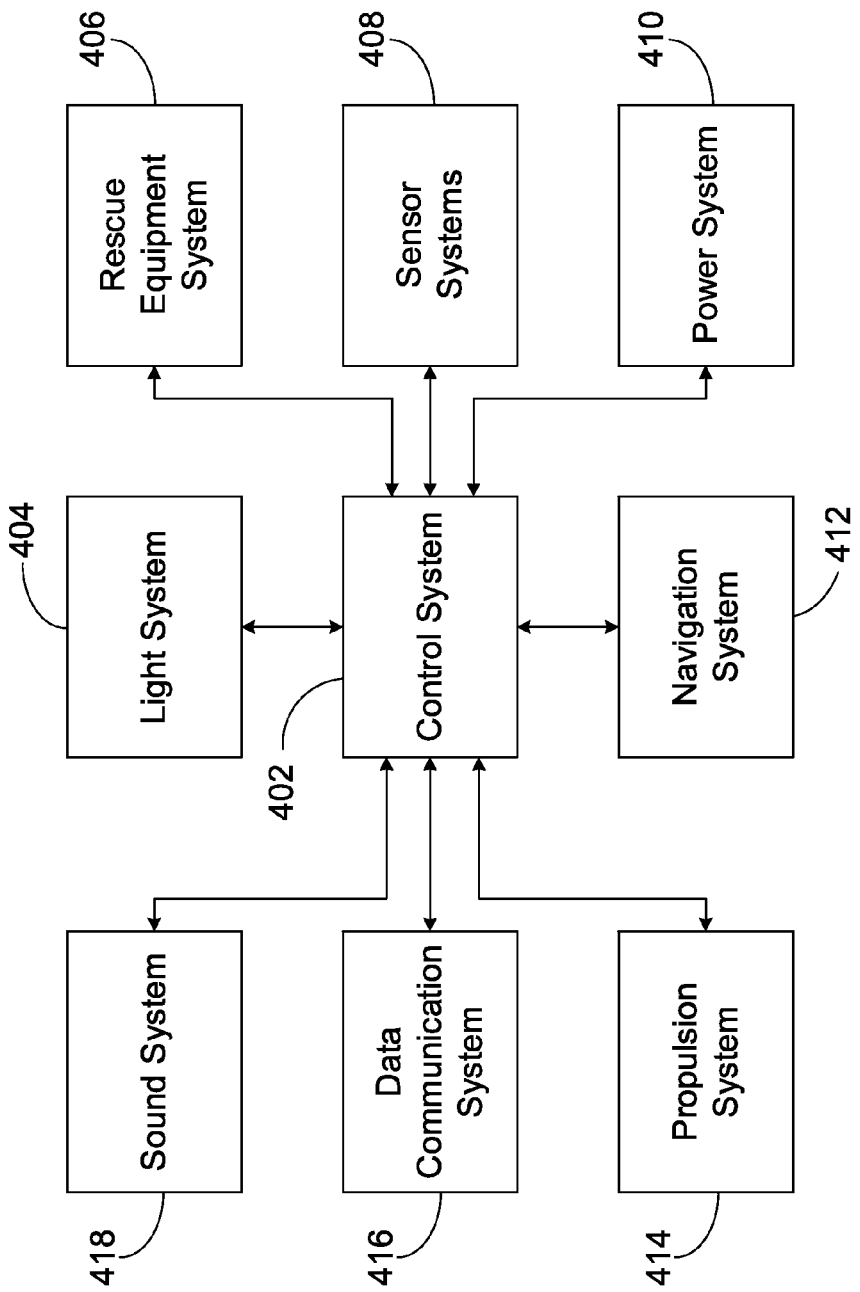
FIG. 4 depicts a logical system diagram of an unmanned aerial rescue system.

FIG. 4 depicts a logical system diagram of an unmanned aerial rescue system 100. Unmanned aerial rescue system 100 includes a control system 402. As described above, control system 402 may include one or more processors, one or more memories, one or more data interfaces, and other circuitry as is known in the art. Control system 402 implements control software embodied in computer-readable media so that control system 402 may interact with other systems of the unmanned aerial rescue system by receiving data from those other systems, processing the data, and sending control data or signals to those systems.

Control system 402 is in data communication with a navigation system 412 and receives location and navigation data from navigation system 412. In return, control system 402 provide navigational instructions and data to navigation system 412 based on, for example, commands received from a remote operator via data communication system 416. Similarly, control system 402 transmits location data received from navigation system 412 to a remote operator via data communication system 416.

Control system 402 also sends control data to propulsion system 414 to control the speed of one or more of the electric motor assemblies (e.g. electric motor assemblies 110 described above), the orientation of an electric motor assembly if connected to a gimbal or other articulable mount, and the pitch of a rotor if connected to an articulable rotor disc. The control data sent to propulsions system 414 may cause the unmanned aerial rescue system 100 to make certain types of movements, such as pivoting about a pitching axis in order to move forwards or backwards; pivoting about a roll axis in order to move to the right or to the left; pivoting about a yaw axis in order to cause the main axis of the unmanned aerial rescue system to turn to the right or the left; and move in translation downwards or upwards. In general, propulsion system 414 is what enables the unmanned aerial rescue system 100 to fly.

Control system 402 also receives operational data from propulsion system 414, such as speed of an electric motor, temperature of an electric motor, current draw of an electric motor, orientation of an electric motor, and others as are known in the art.

Control system 402 also sends control data to propulsion system 414 in order to implement various modes of piloting the unmanned aerial rescue system, such as by remote-control or autonomous control. In the case of remote control, control system 402 may receive remote control data via data communication system 416.

Control system 402 also sends control data and sound data to the sound system so as to cause one or more sound emitters, such as speakers, to emit sounds. Control system 402 also receives sound data from one or more sound capturing devices, such as microphones. With these capabilities, control system 402 creates a two-way communication link between a remote operator and, for example, a person in need of help, by emitting sound to the person and capturing sound from that person.

Control system 402 also sends control data to light system 404 in order to activate one or more light emitters. For example, control system 402 activates navigation lights (e.g. light emitters 138) on the unmanned aerial rescue 100 system during flight as well as a beacon light (e.g. light emitter 104) during flight. Control system 402 also activates one or more light emitters under the shroud (e.g. light emitters 142) in order to produce a flood light effect below unmanned aerial rescue system 100. Control system 402 also activates sensor-specific light emitters, such as infrared light emitters (not shown) in order to improve the performance of related sensors (e.g. infrared cameras).

Control system 402 also sends control data to rescue equipment system 406. For example, control system 402 may deploy a piece of rescue equipment by releasing it from an external equipment carrier (e.g. carriers 122 and 126), or by lowering it using a retractable line system (e.g. equipment deployment means 162). Alternatively, control system 402 may deploy a piece of rescue equipment by releasing it from an external equipment carrier (e.g. carriers 122 and 126) using a tether line system (as described above).

Control system 402 also sends control data to sensor systems 408 in order to control the operation of such systems. Control system 402 also receives and process sensor data from various sensor systems, such as those described above. For example, control system 402 may use the received sensor data to affect its own operation (e.g. collision avoidance or object tracking) or may transmit the sensor data to a remote operator by way of data communication system 416. In some embodiments, control system 402 also receives operational data from the various sensor systems, such as the operational status of any particular sensor.

Control system 402 also sends control data to power system 410 in order to, for example, control the use of one or more power sources, monitor the performance and status of the power source, and control the charging of the power source both when idle (e.g., via ground-based power connection or photovoltaic power generation) or during flight (e.g., via photovoltaic cells 106). Control system 402 may also receives operational data from the power system, such as the status of the power source (e.g., remaining charge of the battery), the amount of power generation (e.g., from the photovoltaic cells), the speed of charging and remaining charge time (e.g., when connected to a ground-based power supply), and others as are known in the art.

Control system 402 also receives control data from a remote control system, as described above.

Figure 5:
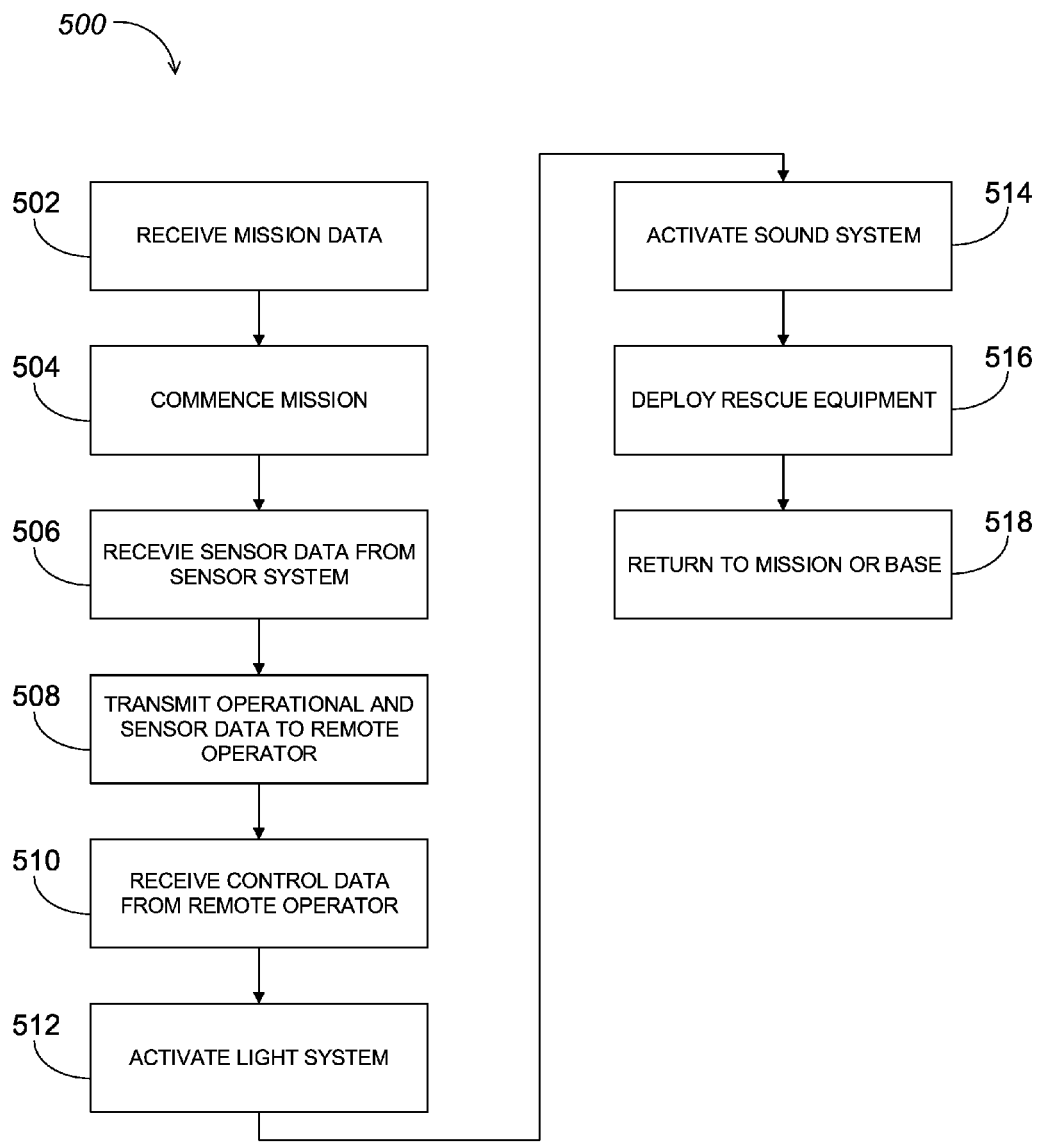
FIG. 5 depicts an exemplary method of using an unmanned aerial rescue system to provide rescue services.

FIG. 5 depicts an exemplary method 500 of using an unmanned aerial rescue system to provide rescue services.

In step 502, an operator programs the unmanned aerial rescue system with mission data. For example, the operator may upload navigational instructions (e.g. GPS waypoints), flight characteristic instructions (e.g. speed, altitude, etc.), logical instructions, (e.g. divert if, hold if, transmit data if, deploy rescue equipment if, etc.), and other types of instructions as are known.

In step 504, the unmanned aerial rescue system commences its mission. For example, the unmanned aerial rescue system may take off from a pad and begin to fly to a first waypoint. For example, in some embodiments, the unmanned aerial rescue system may take off from a land-based launch pad. In other embodiments, the unmanned aerial rescue system may take off from a sea-based vessel.

In step 506, the unmanned aerial rescue system receives sensor data from its sensor system(s) (e.g. sensor systems 408) and processes that sensor data within its control system (e.g. control system 402).

In step 508, the unmanned aerial rescue system transmits data (e.g. operational data and sensor data) to a remote operator, for example, by way of a data communication system (e.g. data communication system 416).

In step 510, the unmanned aerial rescue system receives control data from a remote operator. For example, a remote operator may have spotted an object (e.g. a person in need of rescue services) via a remote data link to the unmanned aerial rescue system's camera system. The remote operator may then instruct the unmanned aerial rescue system to cease following its navigation plan and to instead proceed to and loiter near the object. In some embodiments, the unmanned aerial rescue system may track and loiter via remote, manual navigation commands. In other embodiments, the unmanned aerial rescue system may track the object automatically via object tracking software. In other words, the control system of the unmanned aerial rescue system may receive sensor data, such as image data to identify an object, and cause the propulsion system to move the unmanned aerial rescue system in order to track the object. For example, an object such as a person in the ocean and subject to ocean currents may be tracked by the unmanned aerial rescue system (either manually or automatically) so that the unmanned aerial rescue system may render rescue services to, for example, a person, autonomously or manually.

In step 512, the unmanned aerial rescue system activates its light system (e.g. light system 404) to illuminate the object. For example, a remote operator may activate light emitters 142 in order to provide light to an image sensor. Or a remote operator may activate a sensor-specific light emitter, such as an infrared light emitter, in order to improve performance of that sensor (e.g. an infrared light camera).

In step 514, the unmanned aerial rescue system activates its sound system (e.g. sound system 418) in order to communicate with, for example, a person in need. For example, a remote operator may transmit audio data, such as voice data, to a person by way of the sound system (e.g. through speakers of the sound system). Additionally, a remote operator may receive audio data, such as voice data, from a person by way of the sound system (e.g. via a microphone of the sound system).

In step 516, the unmanned aerial rescue system deploys rescue equipment to a person or to a selected location. For example, the unmanned aerial rescue system may lower a life vest, an IBA, or other rescue equipment, to a person or a selected location using its rescue equipment system (e.g. rescue equipment system 406. In some cases, the unmanned aerial rescue system may drop (rather than lower) the rescue equipment.

In step 518, the unmanned aerial rescue system return to its previous mission (e.g. a pre-programmed navigational plan) or to a landing destination, such as an operations base station.

In some cases, the unmanned aerial rescue system may determine that it needs to return to a landing destination based on control system data, such as a determination by the control system that the available power sources are low. In such cases, the unmanned aerial rescue system may send a message to a remote operator seeking authorization to break from the current operational command (e.g. loiter) and return to base.

In some cases, the unmanned aerial rescue system may be instructed to loiter until the power system capacity declines to a threshold level at which point the unmanned aerial rescue system will descend and land automatically. As described above, the unmanned aerial rescue system may land on the water when outfitted with floatation devices (e.g. flotation devices 138). In such cases, the unmanned aerial rescue system may prioritize systems to keep active (e.g. data communications and light systems) while sacrificing the use of other systems (e.g. propulsion and rescue equipment). In this way, the unmanned aerial rescue system may land on water and continue to communicate its position to a remote operator as well as to indicate its position with the use of its light system.

Notably, method 500 is exemplary only, and includes steps that may or may not be necessary during any particular mission. Additionally, method 500 omits many possible steps that may be necessary, as would be known by those of skill in the art.

Embodiments of an unmanned aerial rescue system described throughout this specification have included structures and functionality presented as separate components, but those separate components may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry or in temporarily configured circuitry (e.g., configured by software) may be driven by application-specific considerations.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain operations may be distributed among the one or more processors, not only residing within a single machine, but deployed across a number of machines.

As used herein, a method may be implemented by a software "algorithm" or a software "routine," which is a sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

Some embodiments may be described using the terms "coupled", "connected," and "attached" along with their derivatives. For example, some embodiments may be described using the term "attached" to indicate that two or more elements are in direct physical or electrical contact. The term "attached," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing unmanned aerial rescue systems. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An unmanned aerial system, comprising:
a frame of the unmanned aerial system;
a landing member attached to the frame;
a propulsion system support member attached to the frame;
at least one electric motor connected to at least one propeller and attached to the propulsion system support member;
a shroud attached to the frame;
a sealed equipment container attached to the frame;
a control system within the sealed equipment container;
a power source within the sealed equipment container; and
a sensor system within the sealed equipment container,
a rescue equipment carrier; and
a rescue equipment release mechanism, wherein the rescue equipment release mechanism is controllable by the control system and configured to release a piece of rescue equipment from the rescue equipment carrier,
wherein the controls system is configured to be powered by the power source and to control the propulsion system and the sensor system.

2. The unmanned aerial system of claim 1, wherein the shroud includes a parabolic portion.

3. The unmanned aerial system of claim 2, further comprising: a light system.

4. The unmanned aerial system of claim 3, further comprising: a sound system.

5. The unmanned aerial system of claim 4, wherein the light system comprises a light emitter located on a top portion of the sealed equipment container.

6. The unmanned aerial system of claim 5, wherein the sound system comprises a sound capturing device located on a top portion of the sealed equipment container.

7. The unmanned aerial system of claim 6, wherein the sound system comprises a sound emitting device located on a top portion of the sealed equipment container.

8. The unmanned aerial system of claim 7, wherein the shroud comprises a reflective inner surface.

9. The unmanned aerial system of claim 8, wherein the light emitter located on a top portion of the sealed equipment container is located near a focal point of the parabolic portion of the shroud.

10. The unmanned aerial system of claim 9, wherein the sound capturing device located on a top portion of the sealed equipment container is located near a focal point of the parabolic portion of the shroud.

11. The unmanned aerial system of claim 10, wherein the sound emitting device located on a top portion of the sealed equipment container is located near a focal point of the parabolic portion of the shroud.

12. The unmanned aerial system of claim 11, further comprising:
a propulsion system shield attached to the propulsion system support member.

13. The unmanned aerial system of claim 12, wherein the at least one electric motor is connected to a gimbal, and wherein the gimbal is controllable by the control system and configured to change the orientation of the at least one electric motor and thereby the orientation of the at least one propeller.

14. The unmanned aerial system of claim 13, further comprising:
a tether line configured to tether the piece of rescue equipment to the unmanned aerial system after the piece of rescue equipment is deployed.

15. The unmanned aerial system of claim 13, wherein the sound capturing device is a microphone.

16. The unmanned aerial system of claim 13, wherein the sound emitting device is a speaker.

17. The unmanned aerial system of claim 2,
wherein the sealed equipment container comprises a transparent portion, and
wherein the sensor system comprises at least one image sensor oriented to receive image data through the transparent portion of the sealed equipment container.

18. The unmanned aerial system of claim 2, wherein the shroud comprises a plurality of photovoltaic cells on an outer surface of the shroud, and wherein the plurality of photovoltaic cells are configured to produce electric current for the unmanned aerial system.

19. An unmanned aerial system, comprising:
a frame;
a plurality of landing members connected to the frame;
an electronic control system;
a plurality of electric motors, each electric motor of the plurality of electric motors connected to a rotor, each electric motor of the plurality of electric motors configured to be controlled by the electronic control system;
a plurality of mesh rotor shields, each rotor shield of the plurality of rotor shields encompassing one of the plurality of electric motors and its connected rotor;
a sealed equipment container connected to the frame and encompassing the electronic control system;
a parabolic shroud connected to the frame;
a plurality of external equipment carriers, each external equipment carrier of the plurality of external equipment carriers attached to the frame and configured to carry a piece of rescue equipment;
an equipment release mechanism for each of the respective external equipment carriers, each equipment release mechanism configured to release a piece of rescue equipment from its respective external equipment carrier;
a light system comprising at least one light emitter;
a sound system comprising at least one sound capturing device and at least one sound emitter;
a sensor system comprising at least one image capturing device; and
a data communication system comprising at least one antenna and at least one transceiver,
wherein the electronic control comprises:
one or more processors;
one or more memories comprising processor-executable software configured to be executed by the one or more processors.

* * * * *